United States Patent
Lee

(10) Patent No.: US 7,212,364 B1
(45) Date of Patent: May 1, 2007

(54) SERVO WRITING A DISK DRIVE BY SYNCHRONIZING A SERVO WRITE CLOCK IN RESPONSE TO A SYNC MARK RELIABILITY METRIC

(75) Inventor: Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/769,386

(22) Filed: Jan. 31, 2004

(51) Int. Cl.
*G11B 5/02* (2006.01)

(52) U.S. Cl. .............................. 360/51; 360/53; 360/75; 360/77.02

(58) Field of Classification Search .................... None
See application file for complete search history.

(56) References Cited

U.S. PATENT DOCUMENTS

| | | | |
|---|---|---|---|
| 5,430,661 A * | 7/1995 | Fisher et al. ................... 716/4 |
| 5,576,906 A | 11/1996 | Fisher et al. |
| 5,583,712 A * | 12/1996 | Brunelle ................... 360/77.07 |
| 5,668,679 A * | 9/1997 | Swearingen et al. .......... 360/75 |
| 5,696,639 A * | 12/1997 | Spurbeck et al. ............. 360/51 |
| 5,754,353 A | 5/1998 | Behrens et al. |
| 5,761,212 A * | 6/1998 | Foland et al. ................ 714/719 |
| 5,831,888 A | 11/1998 | Glover |
| 5,838,512 A * | 11/1998 | Okazaki ...................... 360/51 |
| 5,917,670 A * | 6/1999 | Scaramuzzo et al. ......... 360/53 |
| 6,021,012 A | 2/2000 | Bang |
| 6,023,386 A | 2/2000 | Reed et al. |
| 6,091,564 A * | 7/2000 | Codilian et al. .............. 360/75 |
| 6,101,229 A * | 8/2000 | Glover ........................ 375/354 |
| 6,181,506 B1 * | 1/2001 | Shimura et al. ......... 360/77.13 |
| 6,249,896 B1 | 6/2001 | Ho et al. |
| 6,272,194 B1 * | 8/2001 | Sakamoto .................... 375/368 |
| 6,292,318 B1 | 9/2001 | Hayashi |
| 6,304,407 B1 * | 10/2001 | Baker et al. .................. 360/75 |
| 6,411,452 B1 * | 6/2002 | Cloke .......................... 360/51 |
| 6,411,453 B1 | 6/2002 | Chainer et al. |
| 6,429,989 B1 | 8/2002 | Schultz et al. |
| 6,487,032 B1 * | 11/2002 | Cloke et al. .................. 360/51 |
| 6,507,450 B1 | 1/2003 | Elliott |
| 6,519,107 B1 | 2/2003 | Ehrlich et al. |
| 6,587,293 B1 | 7/2003 | Ding et al. |
| 6,603,622 B1 * | 8/2003 | Christiansen et al. ......... 360/66 |
| 6,704,156 B1 | 3/2004 | Baker et al. |
| 6,738,205 B1 * | 5/2004 | Moran et al. .................. 360/17 |
| 6,791,777 B2 * | 9/2004 | Watanabe et al. ............. 360/51 |
| 6,882,486 B1 * | 4/2005 | Kupferman .................. 360/51 |

(Continued)

*Primary Examiner*—Tan Dinh
*Assistant Examiner*—Dismery Mercedes
(74) *Attorney, Agent, or Firm*—Howard H. Sheerin, Esq.

(57) ABSTRACT

A method of writing product servo sectors to a disk of a disk drive is disclosed. A plurality of spiral tracks are written to the disk, wherein each spiral track comprises a high frequency signal interrupted at a predetermined interval by a sync mark. During the product servo writing process, the sync marks in the spiral tracks are detected and a sync mark reliability metric is generated, wherein the sync mark reliability metric represents a probability that the sync mark was detected accurately. A timing recovery measurement is generated in response to the detected sync marks and the sync mark reliability metrics. A servo write clock is synchronized in response to the timing recovery measurement and used to write the product servo sectors to the disk while serving on the spiral tracks.

10 Claims, 12 Drawing Sheets

U.S. PATENT DOCUMENTS

| | | | |
|---|---|---|---|
| 6,965,489 B1 * | 11/2005 | Lee et al. | 360/75 |
| 6,967,799 B1 * | 11/2005 | Lee | 360/51 |
| 6,985,316 B1 | 1/2006 | Liikanen et al. | |
| 6,987,636 B1 * | 1/2006 | Chue et al. | 360/75 |
| 6,989,954 B1 * | 1/2006 | Lee et al. | 360/75 |
| 7,002,761 B1 * | 2/2006 | Sutardja et al. | 360/29 |
| 7,016,134 B1 * | 3/2006 | Agarwal et al. | 360/51 |
| 7,023,631 B2 * | 4/2006 | Zhang et al. | 360/29 |
| 7,068,461 B1 * | 6/2006 | Chue et al. | 360/75 |
| 2001/0010604 A1 * | 8/2001 | Esumi | 360/49 |
| 2003/0030929 A1 * | 2/2003 | Ozdemir | 360/46 |

* cited by examiner

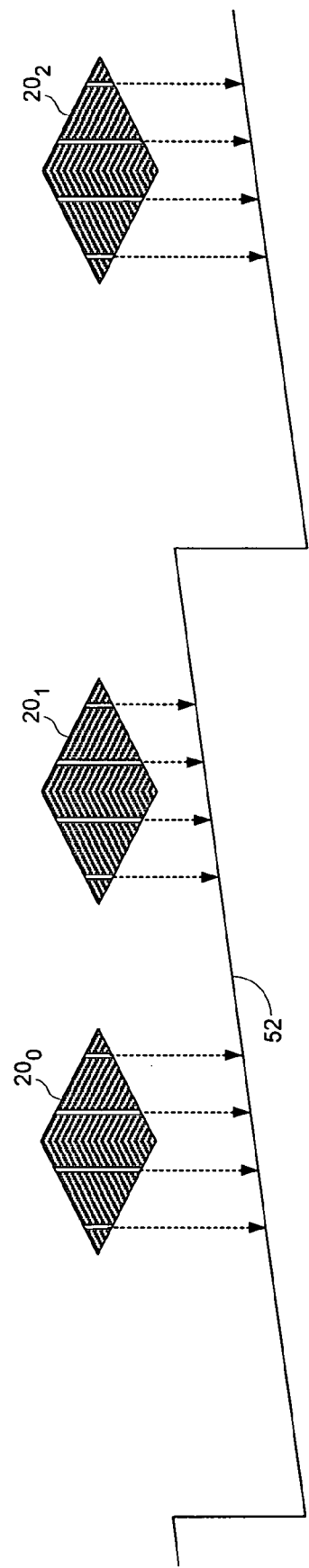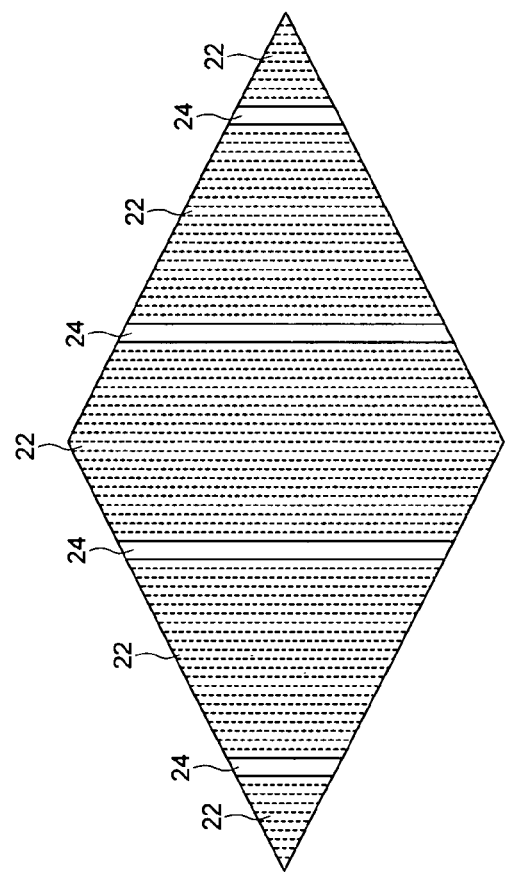
FIG. 3A
FIG. 3B

SERVO WRITING A DISK DRIVE BY SYNCHRONIZING A SERVO WRITE CLOCK IN RESPONSE TO A SYNC MARK RELIABILITY METRIC

BACKGROUND OF THE INVENTION

1. Field of the Invention

The present invention relates to disk drives for computer systems. More particularly, the present invention relates to servo writing a disk drive by synchronizing a servo write clock in response to a sync mark reliability metric.

2. Description of the Prior Art

When manufacturing a disk drive, product servo sectors $2_0$–$2_7$ are written to a disk 4 which define a plurality of radially-spaced, concentric data tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation the servo bursts 14 are processed by the disk drive in order to maintain a head over a centerline of a target track while writing or reading data. In the past, external servo writers have been used to write the product servo sectors $2_0$–$2_7$ to the disk surface during manufacturing. External servo writers employ extremely accurate head positioning mechanics, such as a laser interferometer, to ensure the product servo sectors $2_0$–$2_7$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks. However if the signal-to-noise ratio (SNR) of the read signal is low (e.g., over a media defect), a missing bit may not be detected or falsely detected at the wrong time creating transients in the PLL which degrades the servo writing process.

There is, therefore, a need to better synchronize a servo write clock when servo writing a disk drive by servoing on spiral tracks.

SUMMARY OF THE INVENTION

The present invention may be regarded as a method of writing product servo sectors to a disk of a disk drive. The disk drive comprises control circuitry and a head disk assembly (HDA) comprising the disk, an actuator arm, a head connected to a distal end of the actuator arm, and a voice coil motor for rotating the actuator arm about a pivot to position the head radially over the disk. The disk comprises a plurality of spiral tracks, wherein each spiral track comprises a high frequency signal interrupted at a predetermined interval by a sync mark. The head internal to the disk drive is used to read the spiral tracks to generate a read signal. The read signal is processed to detect a sync mark in a spiral track and to generate an associated sync mark reliability metric, wherein the sync mark reliability metric representing a probability that the sync mark was detected accurately. A timing recovery measurement is generated in response to the detected sync mark and the sync mark reliability metric, and a servo write clock is synchronized in response to the timing recovery measurement. The read signal representing the high frequency signal in the spiral track is processed to generate a position error signal used to maintain the head along a substantially circular target path, and the servo write clock and the head internal to the disk drive are used to write the product servo sectors along the circular target path.

In one embodiment, the sync mark reliability metric is generated by processing the read signal to generate an estimated data sequence and correlating the estimated data sequence with a sync mark pattern.

In still another embodiment, the sync mark reliability metric is generated by rectifying the read signal and generating a DC component of the rectified read signal.

In yet another embodiment, the sync mark reliability metric is generated by sampling the read signal to generate a sequence of read signal sample values, processing the read signal sample values to generate expected sample values, and generating a mean squared error (MSE) from the difference between the expected sample values and the read signal sample values.

In another embodiment, the sync mark reliability metric is generated by rectifying the read signal, integrating the rectified read signal, and generating the sync mark reliability metric and the position error signal from the integration.

In yet another embodiment, if the sync mark reliability metric is above a threshold, the timing recovery measurement is generated in response to the detected sync mark. Otherwise, the detected sync mark is ignored. If a consecutive number of ignored sync marks exceeds a predetermined number and the next sync mark reliability metric is below the threshold, the timing recovery measurement is generated in response to the detected sync mark.

In one embodiment, the control circuitry within the disk drive is used to read the spiral tracks in order to synchronize the servo write clock. In an alternative embodiment, an external product servo writer is used to read the spiral tracks in order to synchronize the servo write clock.

The present invention may also be regarded as a disk drive comprising a disk having a plurality of spiral tracks, wherein each spiral track comprises a high frequency signal interrupted at a predetermined interval by a sync mark. The disk drive further comprises an actuator arm, a head connected to a distal end of the actuator arm, and a voice coil motor for rotating the actuator arm about a pivot to position the head radially over the disk. The head internal to the disk drive is used to read the spiral tracks to generate a read signal. The read signal is processed to detect a sync mark in a spiral track and to generate an associated sync mark reliability metric, wherein the sync mark reliability metric representing a probability that the sync mark was detected accurately. A timing recovery measurement is generated in response to the detected sync mark and the sync mark reliability metric, and a servo write clock is synchronized in response to the timing recovery measurement. The read signal representing the high frequency signal in the spiral track is processed to generate a position error signal used to maintain the head along a substantially circular target path, and the servo write clock and the head internal to the disk drive are used to write product servo sectors along the circular target path.

BRIEF DESCRIPTION OF THE DRAWINGS

FIG. 3A shows an embodiment of the present invention wherein a servo write clock is synchronized by clocking a modulo-N counter relative to when the sync marks in the spiral tracks are detected.

FIG. 3B shows an eye pattern generated by reading the spiral track, including the sync marks in the spiral track.

DESCRIPTION OF THE PREFERRED EMBODIMENTS

Figure 2A:
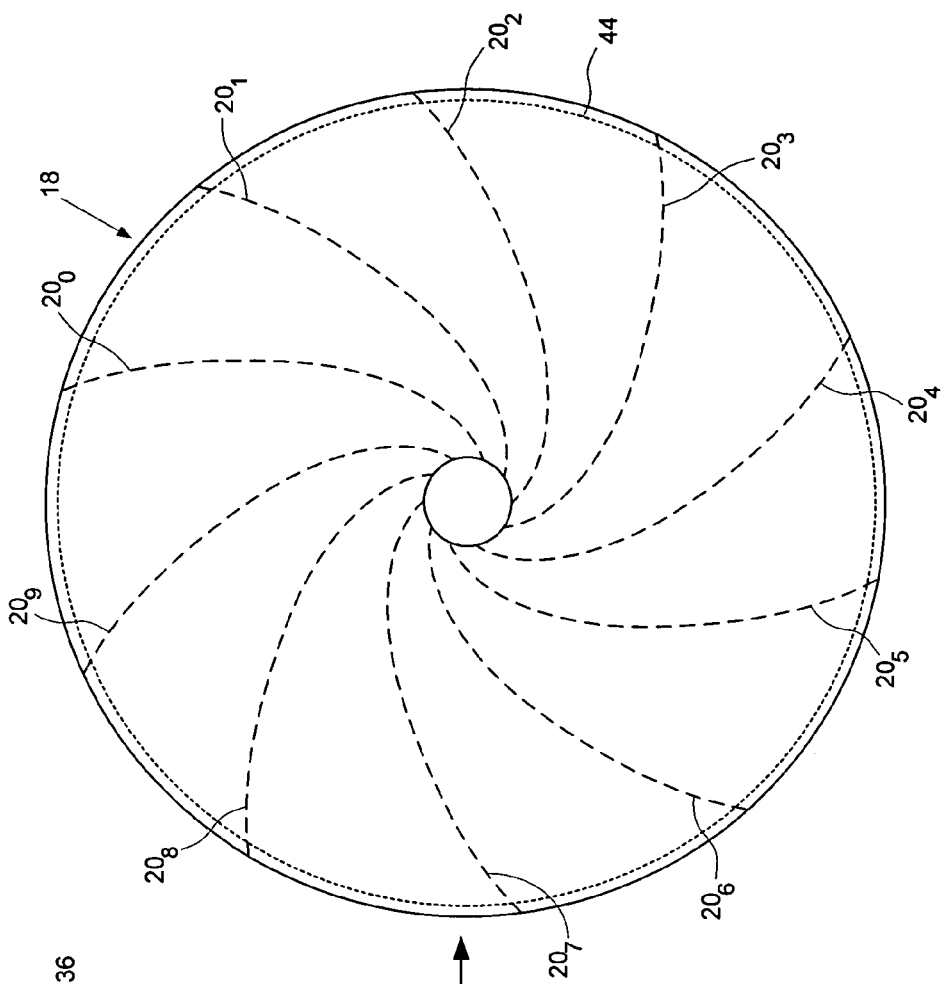
FIGS. 2A and 2B illustrate an embodiment of the present invention wherein an external spiral servo writer is used to write a plurality of spiral tracks to the disk for use in writing product servo sectors to the disk.
Figure 2B:
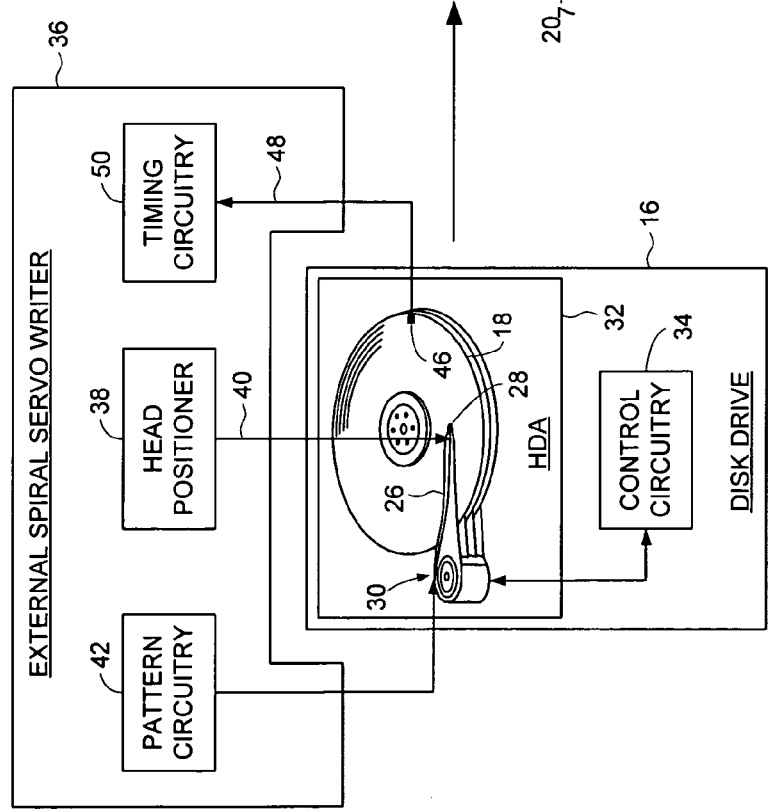

FIGS. 2A and 2B show a disk drive 16 according to an embodiment of the present invention comprising a disk 18 having a plurality of spiral tracks $20_0$–$20_N$, wherein each spiral track 20 comprises a high frequency signal 22 interrupted at a predetermined interval by a sync mark 24 (FIG. 3B). The disk drive 16 further comprises an actuator arm 26, a head 28 connected to a distal end of the actuator arm 26, and a voice coil motor 30 for rotating the actuator arm 26 about a pivot to position the head 28 radially over the disk 18. The head 28 internal to the disk drive 16 is used to read the spiral tracks $20_0$–$20_N$ to generate a read signal. The read signal is processed to detect a sync mark 24 in a spiral track 20 and to generate an associated sync mark reliability metric, wherein the sync mark reliability metric representing a probability that the sync mark 24 was detected accurately. A timing recovery measurement is generated in response to the detected sync mark 24 and the sync mark reliability metric, and a servo write clock is synchronized in response to the timing recovery measurement. The read signal representing the high frequency signal 22 in the spiral track 20 is processed to generate a position error signal used to maintain the head 28 along a substantially circular target path, and the servo write clock and the head 28 internal to the disk drive are used to write the product servo sectors along the circular target path.

In the embodiment of FIG. 2A, the disk 18, actuator arm 26, head 28 and voice coil motor 30 are enclosed in a head disk assembly (HDA) 32 of the disk drive 16. The disk drive 16 further comprises control circuitry 34 mounted on a printed circuit board for controlling operation of the disk drive 16. In one embodiment, the control circuitry 34 writes the spiral tracks $20_0$–$20_N$ to the disk 18 and then processes the spiral tracks $20_0$–$20_N$ to write the product servo sectors to the disk 18.

In an alternative embodiment shown in FIG. 2A, an external spiral servo writer 36 is used to write the spiral tracks $20_0$–$20_N$ to the disk 16. The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$–$20_N$. The external spiral servo writer 36 writes a clock track 44 (FIG. 2B) at an outer diameter of the disk 18, and a clock head 46 is inserted into the HDA 32 for reading the clock track 44 to generate a clock signal 48. Timing circuitry 50 in the external spiral servo writer 36 processes the clock signal 48 to enable the pattern circuitry 42 at the appropriate time so that the spiral tracks $20_0$–$20_N$ are written at the appropriate circumferential location. The clock signal 48 also enables the pattern circuitry 42 to write the sync marks 24 (FIG. 3B) within the spiral tracks $20_0$–$20_N$ at the same circumferential location from the outer diameter to the inner diameter of the disk 18. As described below with reference to FIG. 4, the constant interval between sync marks 24 (independent of the radial location of the head 28) enables the servo write clock to maintain synchronization.

In the embodiment of FIG. 2A, the entire disk drive 16 is shown as being inserted into the external spiral servo writer 36. In an alternative embodiment, only the HDA 32 is inserted into the external spiral servo writer 36.

After the external spiral servo writer 36 writes the spiral tracks $20_0$–$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$–$20_N$ in order to write the product servo sectors to the disk 18. In an alternative embodiment described below with reference to FIGS. 10 and 11, an external product servo writer is used to process the spiral tracks $20_0$–$20_N$ in order to write the product servo sectors to the disk 18 during a "fill operation".

FIG. 3B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information for servoing the head 28.

FIG. 3A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$–$20_N$ are detected at a target modulo-N count value. The servo write clock may be generated using any suitable circuitry. In one embodiment, the servo write clock is generated using a phase locked loop (PLL). As each sync mark 24 in the spiral tracks $20_0$–$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

Figure 1:
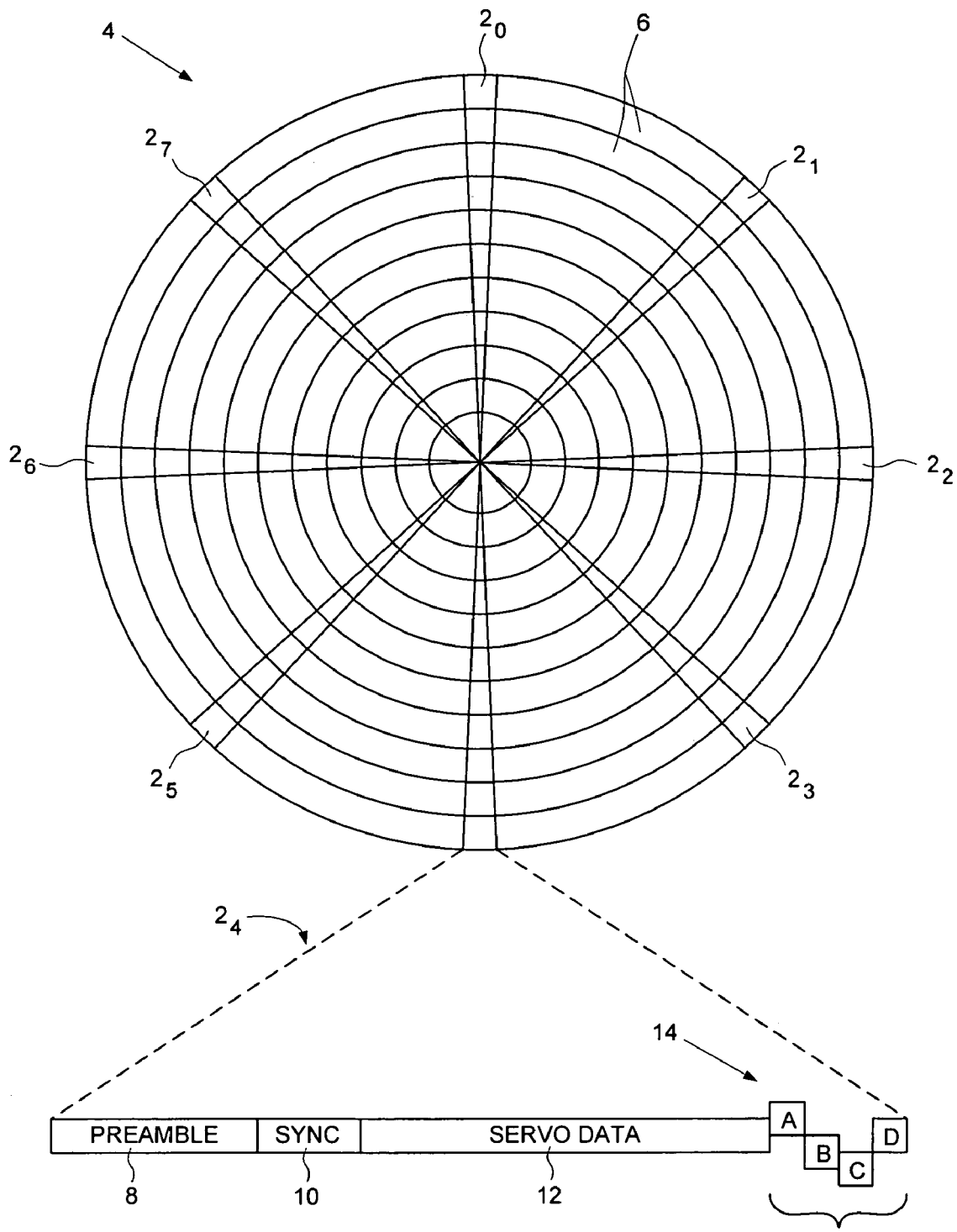
FIG. 1 shows a prior art disk format comprising a plurality of radially spaced, concentric tracks defined by a plurality of product servo sectors.

The sync marks 24 in the spiral tracks $20_0$–$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$–$20_N$ to be written to the disk 18 using a steeper slope (by moving the head 28 faster from the outer diameter to the inner diameter of the disk 18) which reduces the time required to write each spiral track $20_0$–$20_N$.

In one embodiment, the servo write clock is further synchronized by generating a timing recovery measurement from the high frequency signal 22 between the sync marks 24 in the spiral tracks $20_0$–$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 4:
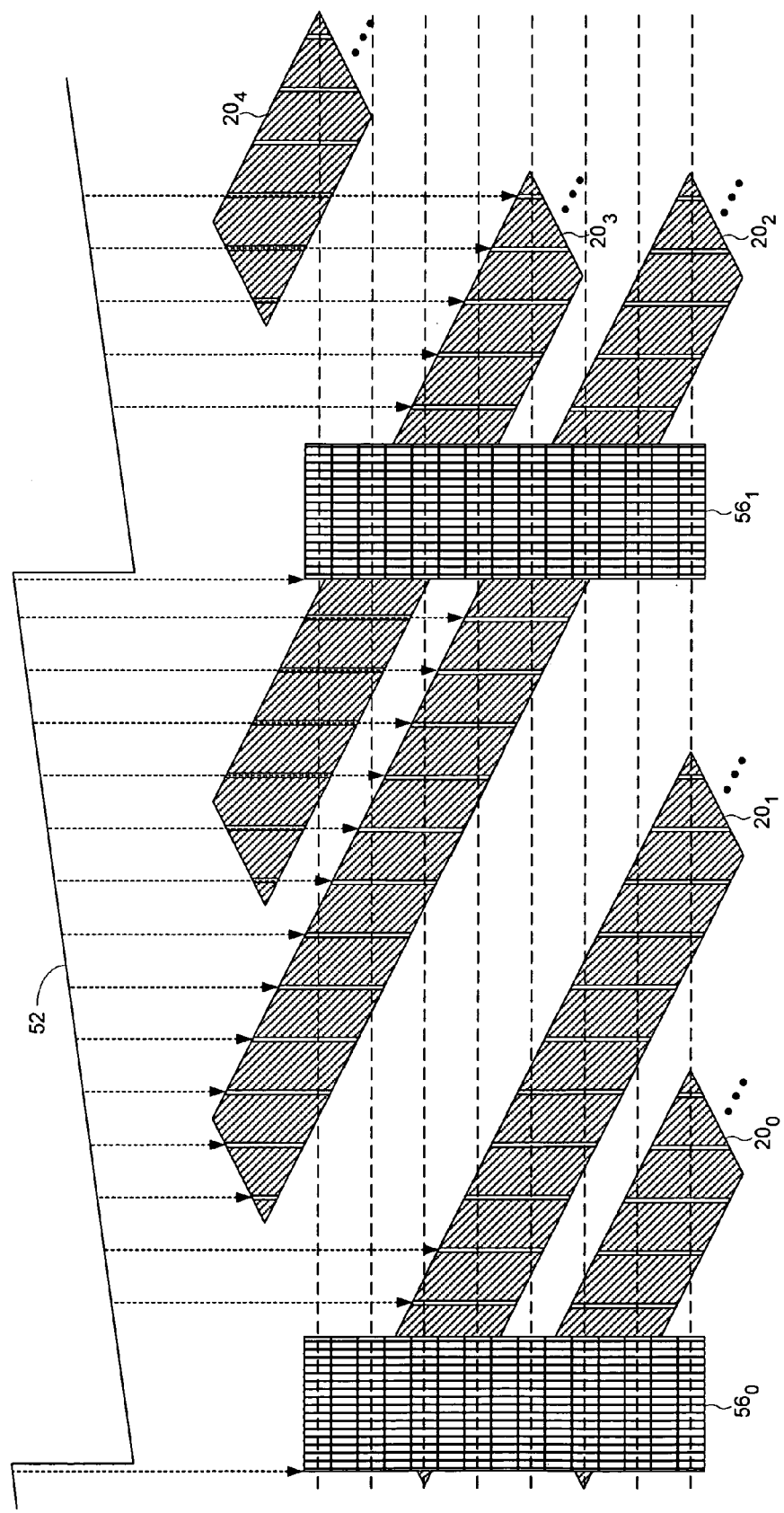
FIG. 4 illustrates an embodiment of the present invention wherein synchronization of the servo write clock is maintained from a coarse timing recovery measurement generated in response to the sync marks recorded in the spiral tracks and a fine timing recovery measurement generated in response to the high frequency signal in the spiral tracks.

FIG. 4 illustrates how the product servo sectors $56_0$–$56_N$ are written to the disk 18 after synchronizing the servo write clock in response to the high frequency signal 22 and the sync marks 24 in the spiral tracks $20_0$–$20_N$. In the embodiment of FIG. 4, the dashed lines represent 4 the centerlines of the data tracks. The sync marks in the spiral tracks $20_0$–$20_N$ are written so that there is a shift of two sync marks in the eye pattern (FIG. 3B) between data tracks. In an alternative embodiment, the sync marks in the spiral tracks $20_0$–$20_N$ are written so that there is a shift of N sync marks in the eye pattern between data tracks. In practice the width of the spiral tracks $20_0$–$20_N$ in the embodiment of FIG. 4 will be proximate the width of a data track. The spiral tracks $20_0$–$20_N$ are shown in FIG. 4 as being wider than the width of a data track for illustration purposes.

The PES for maintaining the head 28 along a servo track (tracking) may be generated from the spiral tracks $20_0$–$20_N$ in any suitable manner. In one embodiment, the PES is generated by detecting the eye pattern in FIG. 3B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the conventional servo sectors (FIG. 1). Once the head 28 is tracking on a servo track, the product servo sectors $56_0$–$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$–$20_N$ on the disk are processed in an interleaved manner to account for the product servo sectors $56_0$–$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement.

Figure 5:
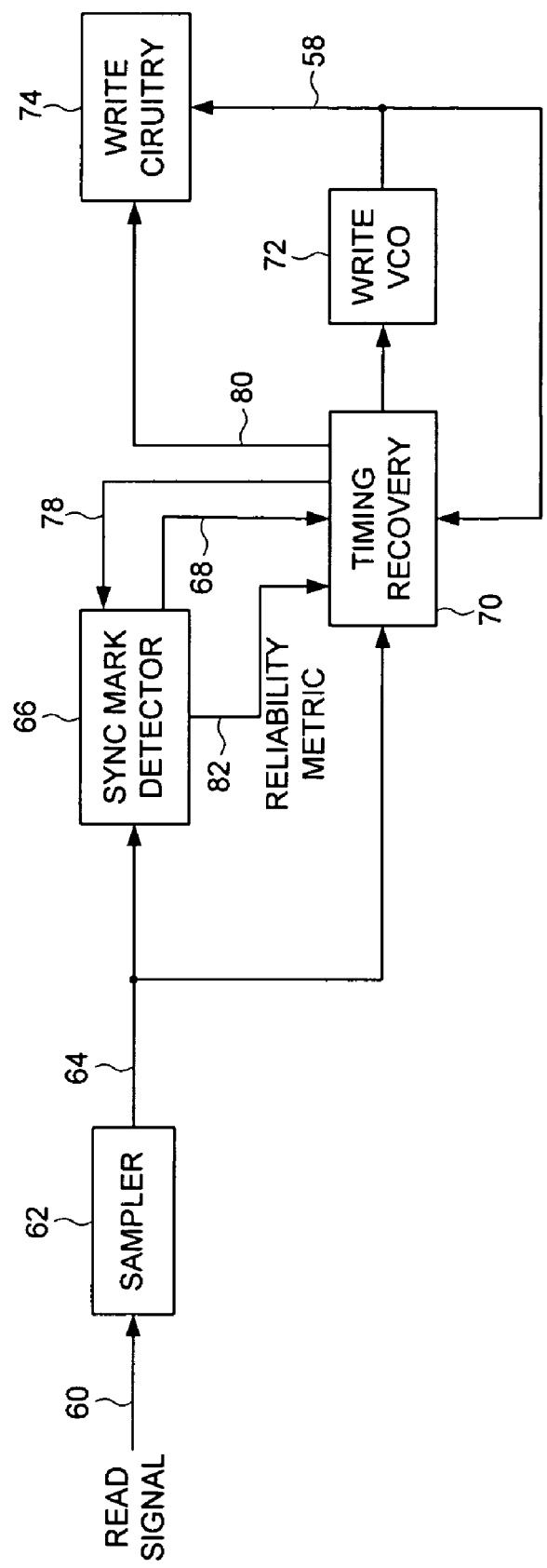
FIG. 5 shows circuitry according to an embodiment of the present invention for generating the servo write clock including a sync detector for detecting the sync marks in the spiral tracks together with a sync mark reliability metric used by a timing recovery circuit to generate a timing recovery measurement.

FIG. 5 shows details of control circuitry for synchronizing the servo write clock 58. The read signal 60 emanating from the head 28 is sampled 62, and the read signal sample values 64 are processed by a sync mark detector 66 for detecting the sync marks 24 in the spiral tracks $20_0$–$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$–$20_N$ to generate a fine timing recovery measurement. The coarse and fine timing recovery measurements are combined to generate a control signal applied to a write voltage controlled oscillator (VCO) 72 which outputs the servo write clock 58. The servo write clock 58 clocks operation of write circuitry 74 for writing the product servo sectors $56_0$–$56_N$ to the disk 18. The servo write clock 58 is also fed back into the timing recovery circuit 70 and used to clock the modulo-N counter to generate the coarse timing recovery measurement. The timing recovery circuit 70 generates a sync mark detection window over line 78 for enabling the sync mark detector 66 during a window where a sync mark 24 is expected to occur.

The timing recovery circuit 70 also generates a control signal over line 80 to enable the write circuitry 74 to begin writing a product servo sector at the appropriate time.

The sync mark detector 66 generates a sync mark reliability metric 82 applied to the timing recovery circuit 70, wherein the sync mark reliability metric 82 represents a probability that the sync mark 24 was detected accurately. As described in greater detail below with reference to FIG. 9, the timing recovery circuit 70 may ignore a detected sync mark (not update the coarse timing recovery measurement) if the sync mark reliability metric 82 is below a threshold. The sync mark reliability metric 82 may be generated in any suitable manner, and the sync mark detector 66 implemented using any suitable circuitry.

Figure 6:
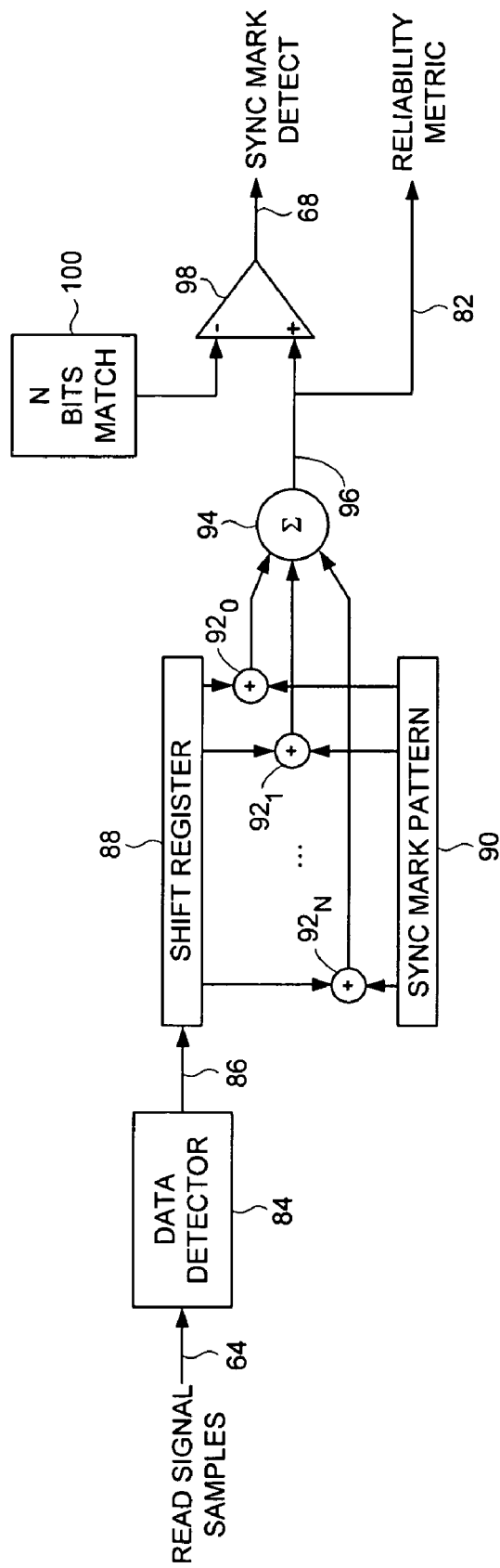
FIG. 6 shows an embodiment of the sync mark detector including a data detector and a correlator for correlating a detected data sequence with the sync mark pattern, wherein the correlation is compared to a threshold to detect the sync mark and the correlation is also the sync mark reliability metric.

FIG. 6 shows details of a suitable sync mark detector 66 according to an embodiment of the present invention. A data detector 84 (e.g., a slicer, peak detector, discrete time sequence detector, etc.) processes the read signal sample values 64 to detect an estimated binary data sequence 86 that is shifted into a shift register 88. The estimated binary data sequence stored in shift register 88 is correlated with a sync mark pattern stored in register 90 using a plurality of XOR gates $92_0$–$92_N$. In an alternative embodiment, the read signal samples 64 are correlated with expected samples of the sync mark pattern. The outputs of the XOR gates $92_0$–$92_N$ are summed 94 and the summation 96 compared 98 to a threshold 100. If the summation 98 exceeds the threshold 100 (meaning that at least N bits in the estimated data sequence 88 match the sync mark pattern 90) the sync mark detect signal 68 is activated. In this embodiment, the summation 96 is also output as the sync mark reliability metric 82, wherein the higher the summation 96 the more likely the sync mark 24 is detected accurately. The threshold 100 may be set relatively low so that a sync mark 24 is detected even in the presence of substantial signal noise (e.g., due to a media defect). The timing recovery circuit 70 evaluates the sync mark reliability metric 82 to determine whether to use the detected sync mark 24 to update the coarse timing recovery measurement.

Figure 7A:
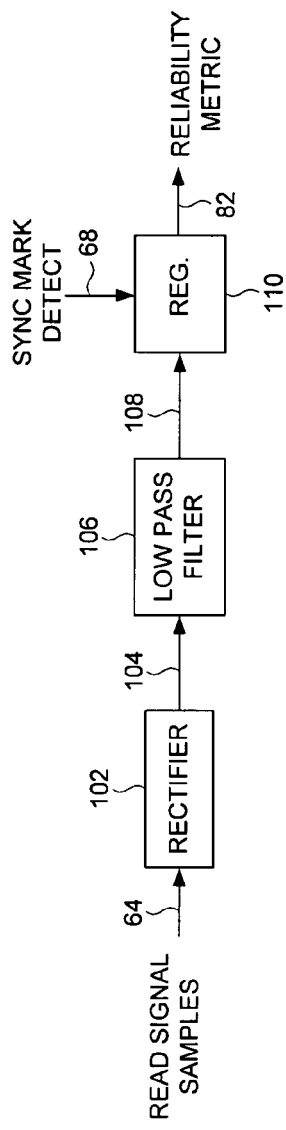
FIG. 7A shows an embodiment of the present invention wherein the sync mark reliability metric is generated by computing the average magnitude of the rectified read signal.

FIG. 7A shows an alternative embodiment for generating the sync mark reliability metric 82. The read signal sample values 64 are rectified 102, and the rectified read signal sample values 104 are low pass filtered 106 to extract the DC component 108. When a sync mark is detected 68, a register 110 stores the DC component 108 of the rectified read signal, wherein the higher the DC component 108 the more likely the sync mark 24 is detected accurately.

Figure 7B:
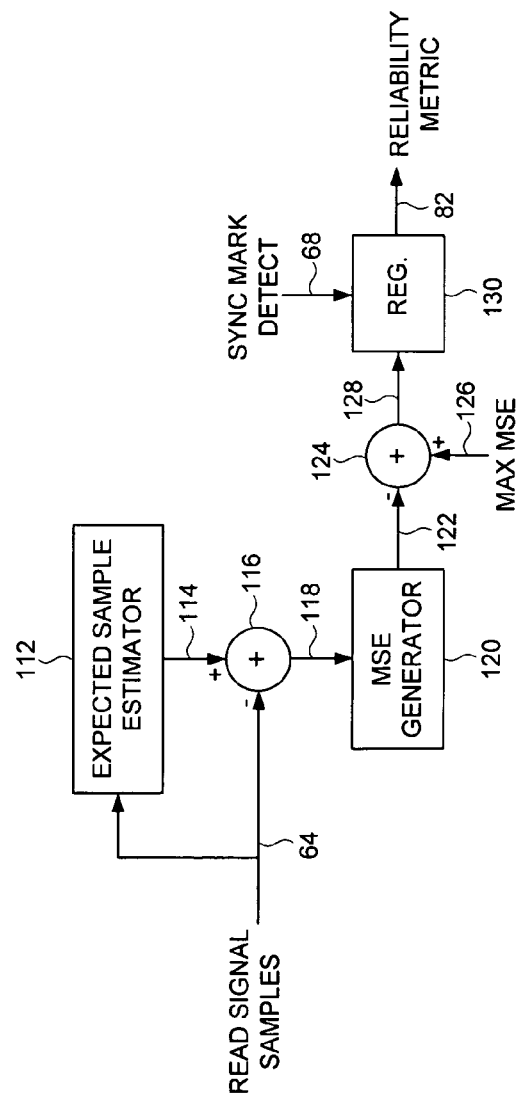
FIG. 7B shows an embodiment of the present invention wherein the sync mark reliability metric is generated by computing a mean squared error (MSE) between expected and actual read signal sample values.

FIG. 7B shows yet another embodiment for generating the sync mark reliability metric 82. An expected sample estimator 112 processes the read signal sample values 64 to generate a sequence of expected or ideal sample values 114. The read signal sample values 64 are subtracted 116 from the expected sample values 114 to generate a sequence of sample errors 118. A MSE generator 120 processes the sample errors 118 to compute a mean squared error (MSE) 122 which is subtracted 124 from a MAX MSE 126. When a sync mark is detected 68, a register 130 stores the output 128 of the subtractor 124, wherein the lower the MSE 122 (the higher the subtraction signal 128) the more likely the sync mark 24 is detected accurately. In one embodiment, the expected sample estimator 112 is implemented using a slicer wherein the slicer levels are adjusted to compensate for the gain variations in the read signal 60 (eye pattern of FIG. 3B) as the head 28 crosses over a spiral track 20.

Figure 8:
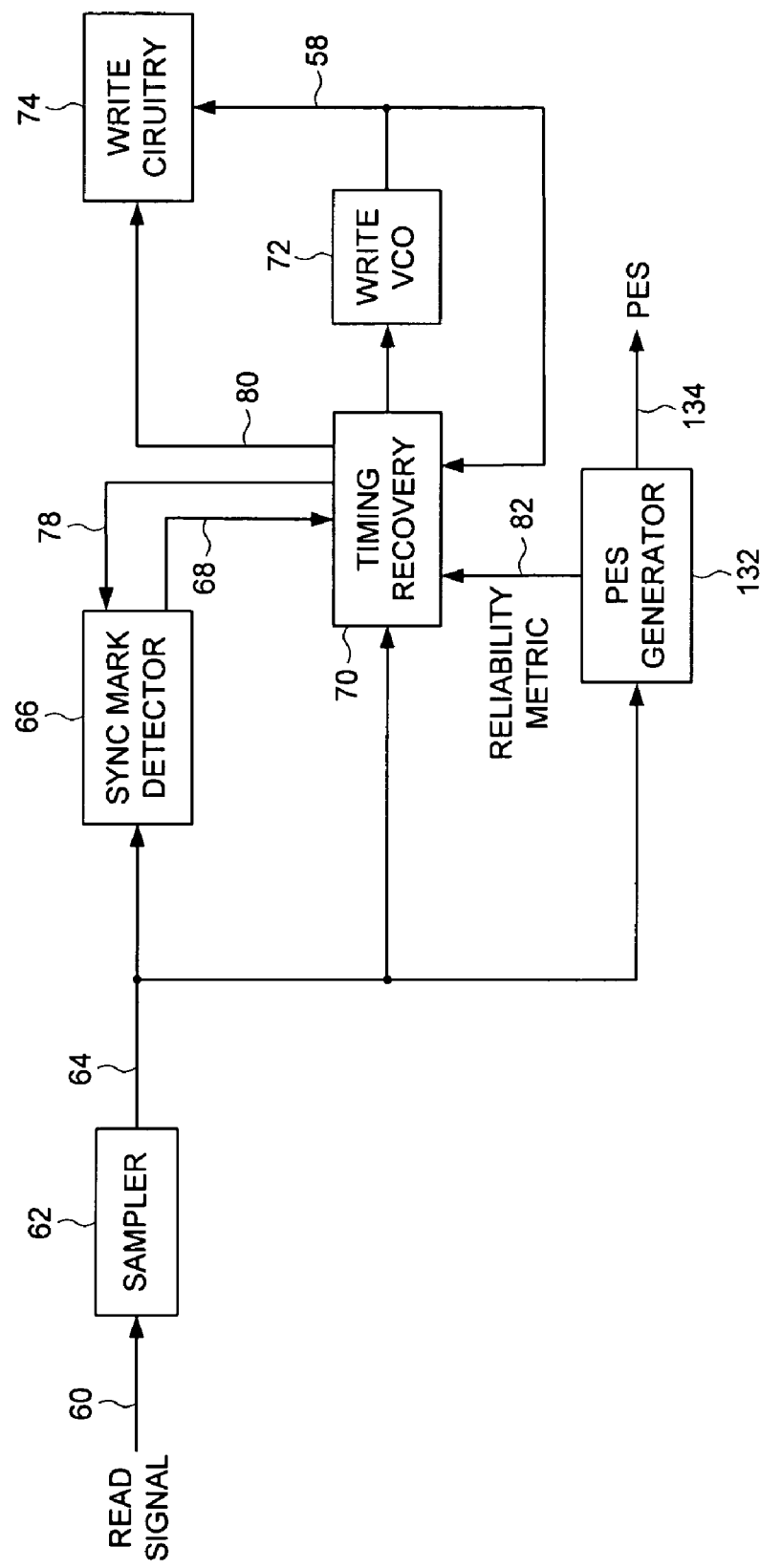
FIG. 8 shows an embodiment of the present invention wherein the sync mark reliability metric is generated by a position error signal (PES) generator which processes (e.g., rectifies and integrates) the high frequency signal in the spiral tracks to generate a PES signal used for tracking.

FIG. 8 shows still another embodiment of the present invention for generating the sync mark reliability metric 82. In this embodiment, a PES generator 132 processes the read signal sample values 64 representing the high frequency signal 22 in the spiral tracks 20 to generate a position error signal (PES) 134 for use in maintaining the head 28 along the circular target path while writing the product servo sectors. The PES generator 132 may generate the PES 134 in any suitable manner, and in one embodiment, rectifies and integrates the read signal sample values 64 to generate the PES 134. The magnitude of the integrated signal is also output as the sync mark reliability metric 82, wherein the higher the integration the more likely the corresponding sync mark 24 is detected accurately.

Figure 9:
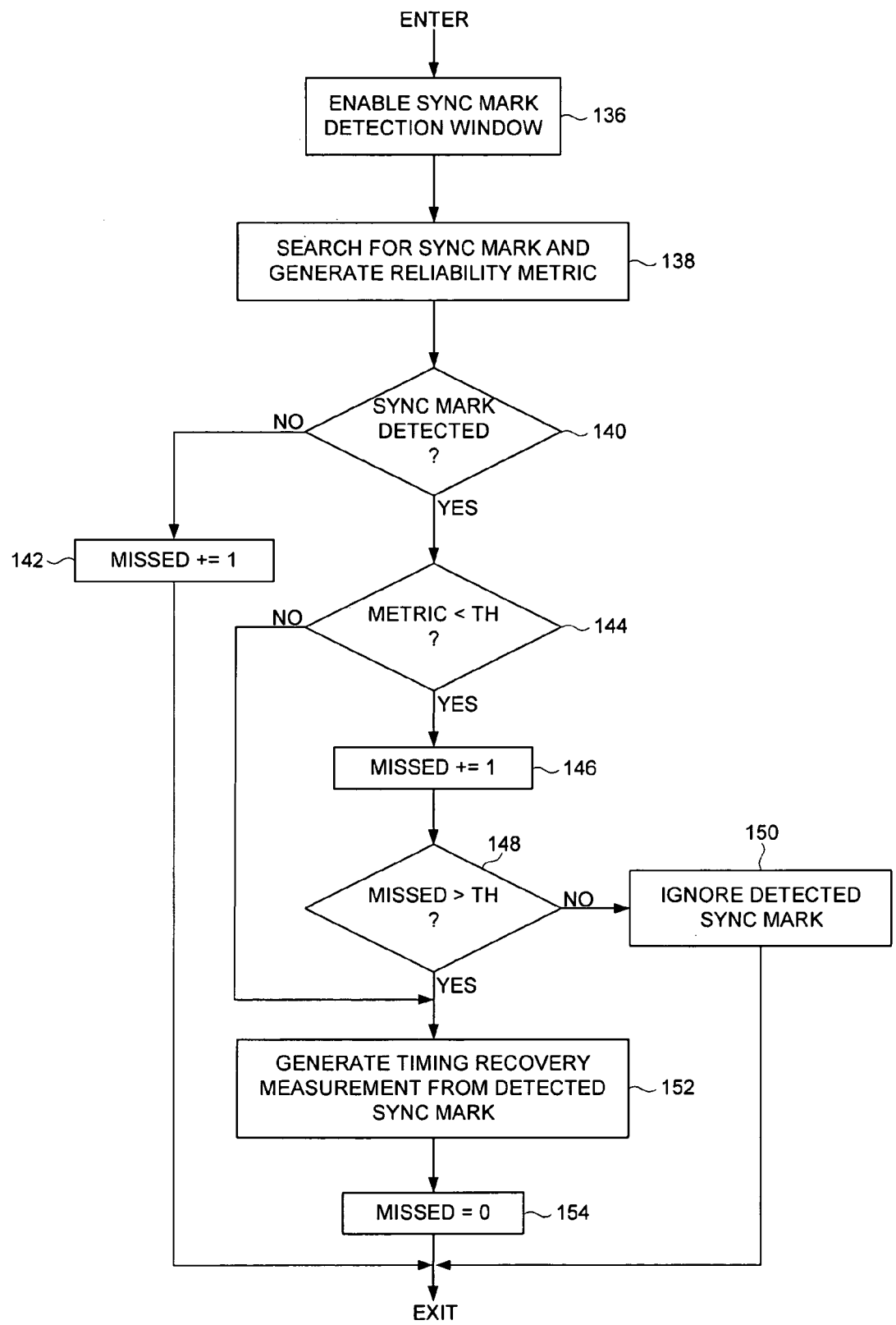
FIG. 9 shows a flow diagram according to an embodiment of the present invention wherein a timing recovery measurement is not generated if the sync mark reliability metric is too low unless a predetermined number of consecutive sync marks have been ignored.

FIG. 9 shows a flow chart according to an embodiment of the present invention wherein a predetermined number of consecutive sync marks 24 having a low reliability metric are ignored. At step 136 a sync mark detection window is enabled as the head 28 approaches a sync mark 24 in a spiral track 20. At step 138, the sync mark detector 66 searches for the sync mark 24 and generates the sync mark reliability metric 82. If at step 140 the sync mark 24 is missed, then at step 142 a variable MISSED is incremented. If the sync mark 24 is detected at step 140, but at step 144 the reliability metric is below a predetermined threshold, then at step 146 the variable MISSED is incremented. If at step 148 the number of consecutive sync marks MISSED is less than a predetermined number, then at step 150 the sync mark 24 is ignored (not used to update the coarse timing recovery measurement). If at step 148 the number of consecutive sync marks MISSED exceeds the predetermined number, then at step 152 the sync mark 24 is used to generate the coarse timing recovery measurement and at step 154 the variable MISSED is reset. Using the high reliability sync marks 24 to update the timing recovery measurements reduces jitter in the timing recovery PLL. In addition, updating the timing recovery measurement during low SNR periods (e.g., over a media defect) helps the timing recovery circuit 70 maintain synchronization of the servo write clock 58 even though the sync marks 24 may be detected with low reliability.

Figure 10:
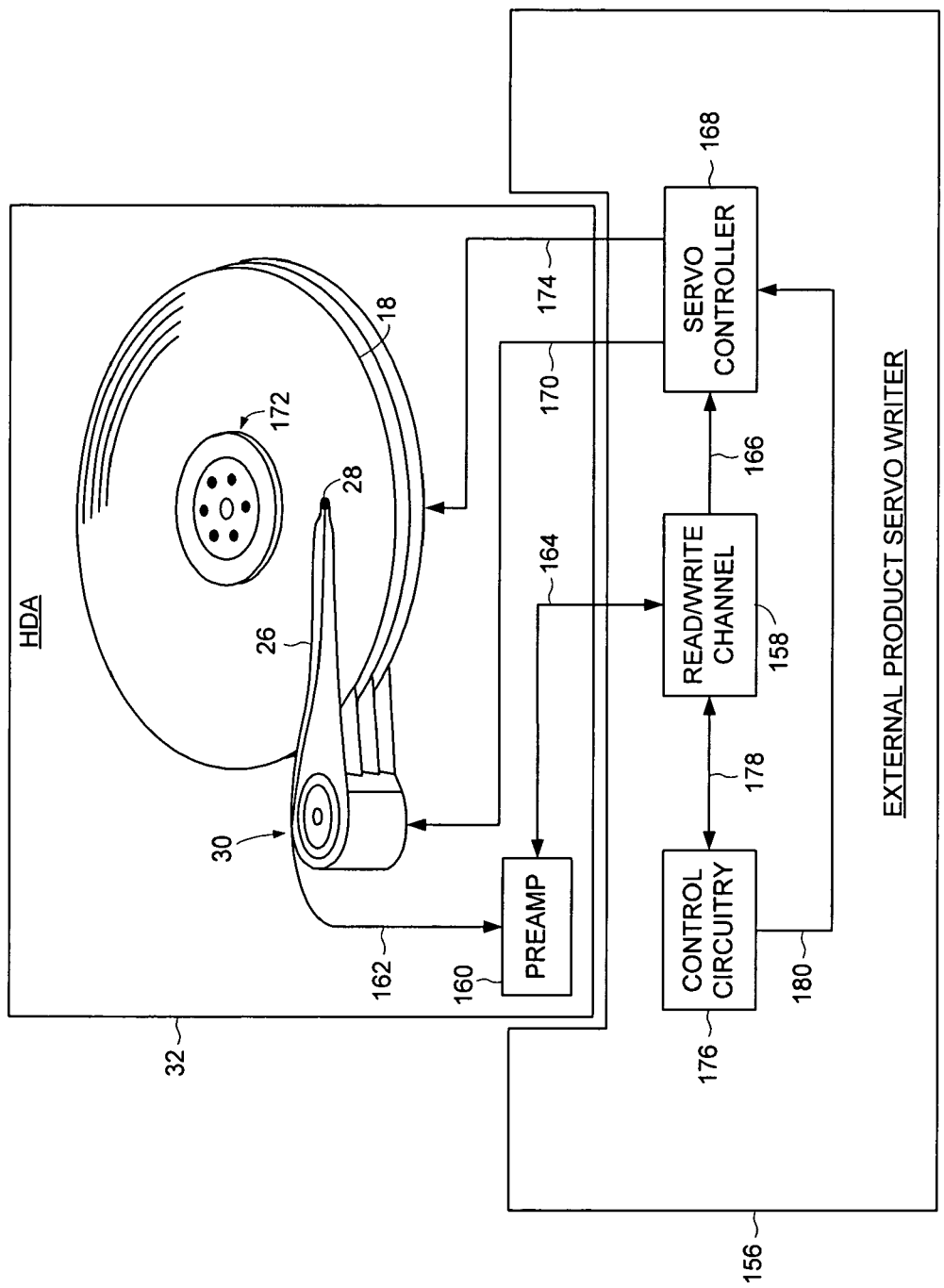
FIG. 10 shows an embodiment of the present invention wherein an external product servo writer is used to process the spiral tracks in order to write the product servo sectors to the disk.
Figure 11:
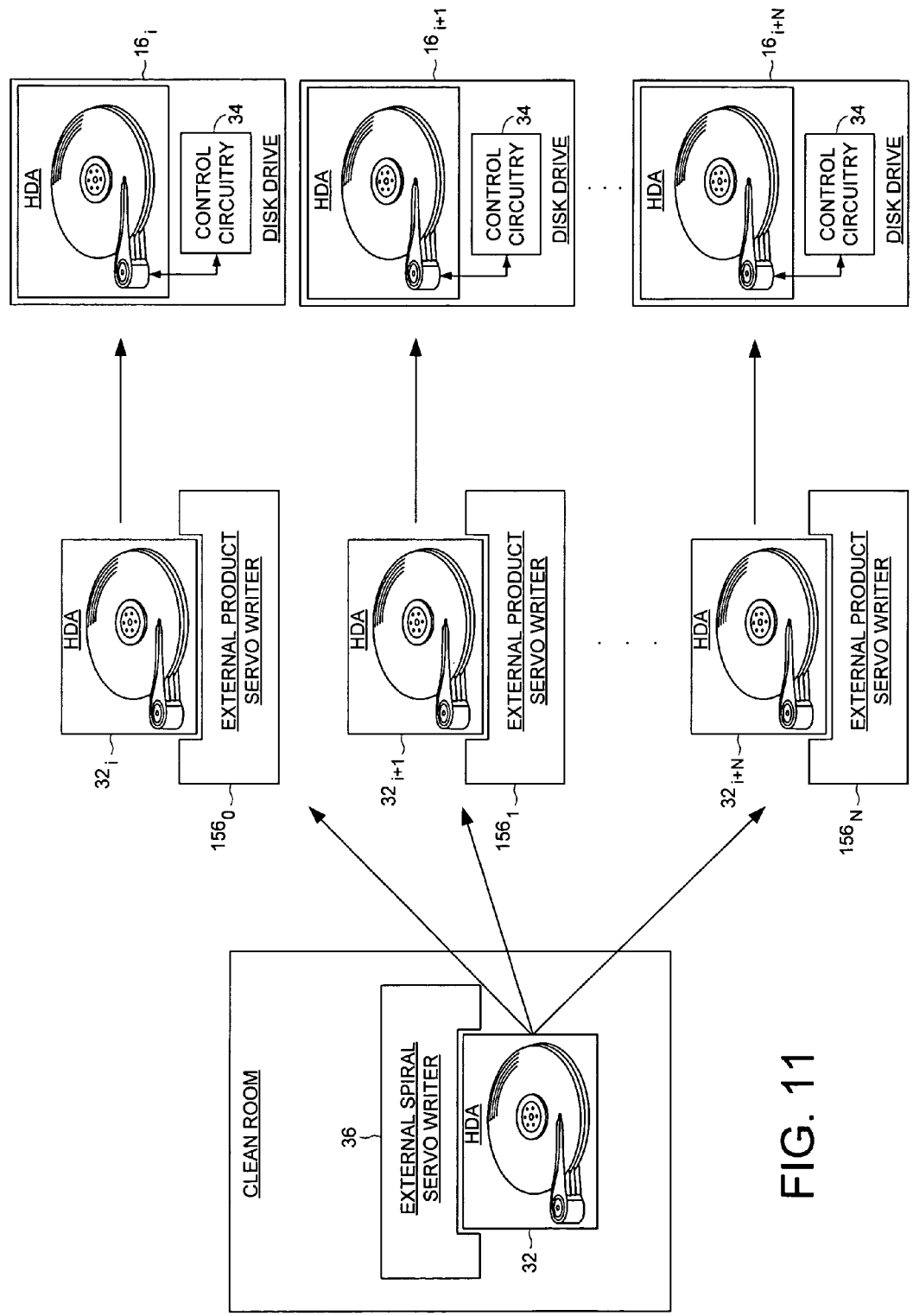
FIG. 11 shows an embodiment of the present invention wherein an external spiral servo writer is used to write the spiral tracks, and a plurality of external product servo writers write the product servo sectors for the HDAs output by the external spiral servo writer.

FIG. 10 shows an embodiment of the present invention wherein after writing the spiral tracks $20_0$–$20_N$ to the disk 18 (FIGS. 2A–2B), the HDA 32 is inserted into an external product servo writer 156 comprising suitable circuitry for reading and processing the spiral tracks $20_0$–$20_N$ in order to write the product servo sectors $56_0$–$56_N$ to the disk 18. The external product servo writer 156 comprises a read/write channel 158 for interfacing with a preamp 160 in the HDA 32. The preamp 160 amplifies a read signal emanating from the head 28 over line 162 to generate an amplified read signal applied to the read/write channel 158 over line 164. The read/write channel 158 comprises circuitry for generating servo burst signals 166 applied to a servo controller 168. The servo controller 168 processes the servo burst signals 166 to generate the PES. The PES is processed to generate a VCM control signal applied to the VCM 30 over line 170 in order to maintain the head 28 along a circular path while writing the product servo sectors $56_0$–$56_N$. The servo controller 168 also generates a spindle motor control signal applied to a spindle motor 172 over line 174 to maintain the disk 18 at a desired angular velocity. Control circuitry 176 processes information received from the read/write channel 158 over line 178 associated with the spiral tracks $20_0$–$20_N$ (e.g., timing information) and provides the product servo sector data to the read/write channel 158 at the appropriate time. The product servo sector data is provided to the preamp 160 which modulates a current in the head 28 in order to write the product servo sectors $56_0$–$56_N$ to the disk 18. The control circuitry 176 also transmits control information over line 180 to the servo controller 168 such as the target servo track to be written. After writing the product servo sectors $56_0$–$56_N$ to the disk 18, the HDA 32 is removed from the external product servo writer 156 and a printed circuit board assembly (PCBA) comprising the control circuitry 34 (FIG. 2A) is mounted to the HDA 32.

Figure 12:
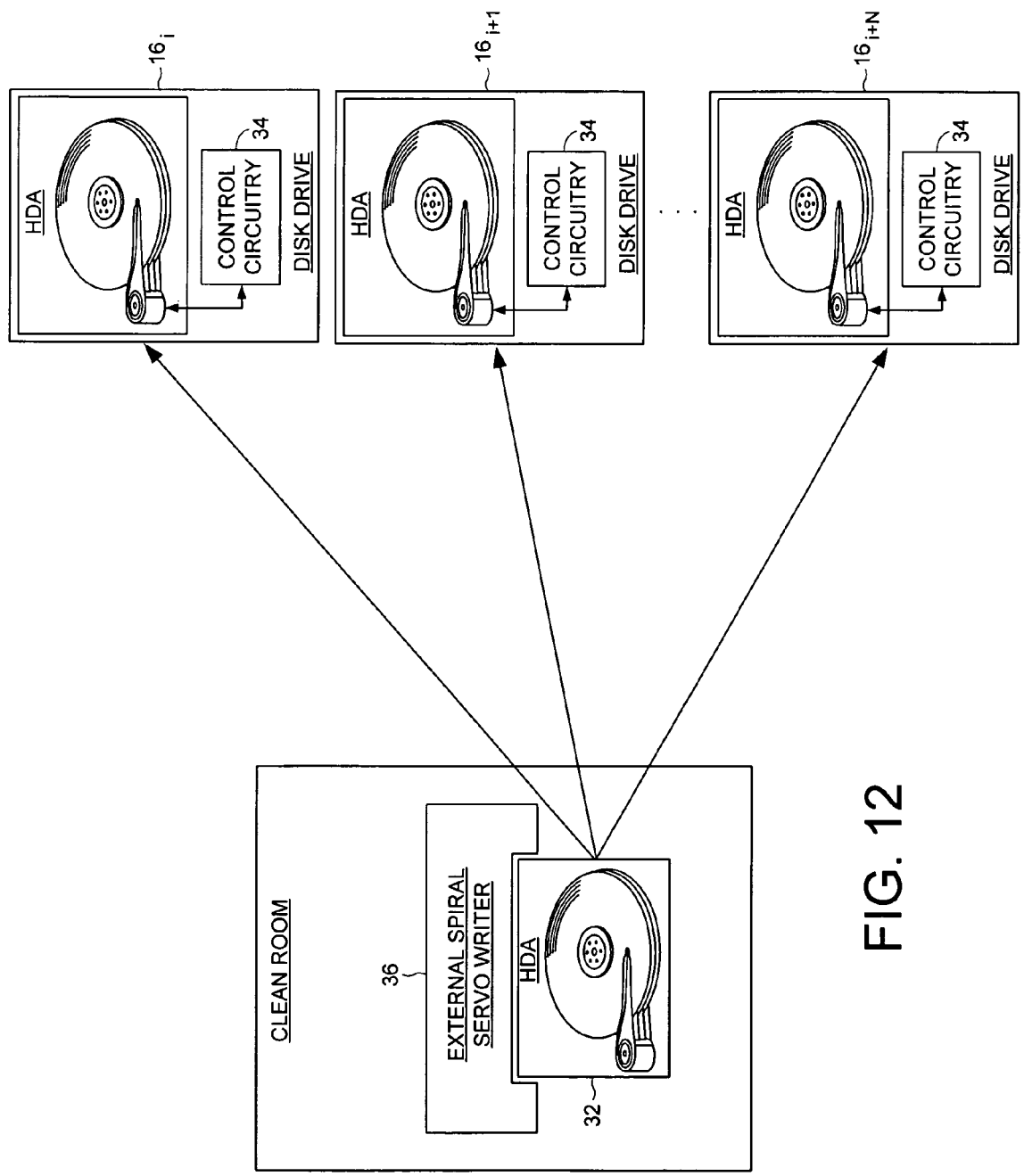
FIG. 12 shows an embodiment of the present invention wherein an external spiral servo writer is used to write the spiral tracks, and the control circuitry within each product disk drive is used to write the product servo sectors.

In one embodiment, the external product servo writer 156 of FIG. 10 interfaces with the HDA 32 over the same connections as the control circuitry 34 to minimize the modifications needed to facilitate the external product servo writer 156. The external product servo writer 156 is less expensive than a conventional servo writer because it does not require a clean room or sophisticated head positioning mechanics. In an embodiment shown in FIG. 11, a plurality of external product servo writers $156_0$–$156_N$ process the HDAs $32_{i-i+N}$ output by an external spiral servo writer 36 in order to write the product servo sectors less expensively and more efficiently than a conventional servo writer. In an alternative embodiment shown in FIG. 12, an external spiral servo writer 36 is used to write the spiral tracks, and the control circuitry 34 within each product disk drive $16_0$–$16_N$ is used to write the product servo sectors.

We claim:

1. A method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the method comprising the steps of:
    (a) using the head internal to the disk drive to read the spiral tracks to generate a read signal;
    (b) processing the read signal to detect a sync mark in a spiral track and generating an associated sync mark reliability metric, the sync mark reliability metric representing a probability that the sync mark was detected accurately;
    (c) generating a timing recovery measurement in response to the detected sync mark and the sync mark reliability metric;
    (d) synchronizing a servo write clock in response to the timing recovery measurement;
    (e) processing the read signal representing the high frequency signal in the spiral track to generate a position error signal (PES) used to maintain the head along a substantially circular target path; and
    (f) using the servo write clock and the head internal to the disk drive to write the product servo sectors along the circular target path.

2. The method as recited in claim 1, wherein the step of generating the sync mark reliability metric comprises the steps of:
    (a) rectifying the read signal; and
    (b) generating a DC component of the rectified read signal.

3. The method as recited in claim 1, wherein the step of generating the timing recovery measurement comprises the steps of;
    (a) comparing the sync mark reliability metric to a threshold;
    (b) if the sync mark reliability metric is above the threshold, generating the timing recovery measurement in response to the detected sync mark; and
    (c) if the sync mark reliability metric is below the threshold, ignoring the detected sync mark.

4. The method as recited in claim 1, wherein the control circuitry within the disk drive is used to read the spiral tracks in order to synchronize the servo write clock.

5. The method as recited in claim 1, wherein an external product servo writer is used to read the spiral tracks in order to synchronize the servo write clock.

6. A method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the method comprising the steps of:
    (a) using the head internal to the disk drive to read the spiral tracks to generate a read signal;
    (b) processing the read signal to detect a sync mark in a spiral track and generating an associated sync mark reliability metric, the sync mark reliability metric representing a probability that the sync mark was detected accurately;
    (c) generating a timimg recovery measurement in response to the detected sync mark and the sync mark relaibility metric;
    (d) synchronizing a servo write clock in response to the timing recovery measurement;
    (e) processing the read signal representing the high frequency signal in the spiral track to generate a position error signal (PES) used to maintain the head along a substantially circular target path; and
    (f) using the servo write clock and the head internal to the disk drive to write the product servo sectors along the circular target path wherein the step of generating the timing recovery measurement comprises the steps of:
    (i) comparing the sync mark reliability metric to a threshold;
    (ii) if the sync mark reliability metric is above the threshold, generating the timing recovery measurement in response to the detected sync mark;
    (iii) if the sync mark reliability metric is below the threshold, ignoring the detected sync mark,
    (iv) accumulating the consecutive number of ignored sync marks; and
    (v) if the accumulation exceeds a predetermined number and the sync mark reliability metric is below the threshold, generating the timing recovery measurement in response to the detected sync mark.

7. A disk drive comprising:
    (a) a disk comprising a plurality of spiral tracks, wherein each spiral track comprises a high frequency signal interrupted at a predetermined interval by a sync mark;
    (b) an actuator arm;
    (c) a head connected to a distal end of the actuator arm;
    (d) a voice coil motor for rotating the actuator arm about a pivot to position the head radially over the disk; and
    (e) control circuitry for writing a plurality of product servo sectors to the disk to
        define a plurality of radially spaced, concentric data tracks by:
            using the head internal to the disk drive to read the spiral tracks to generate a read signal;
            processing the read signal to detect a sync mark in a spiral track and generating an associated sync mark reliability metric, the sync mark reliability metric representing a probability that the sync mark was detected accurately;

generating a timing recovery measurement in response to the detected sync mark and the sync mark reliability metric;

synchronizing a servo write clock in response to the timing recovery measurement;

processing the read signal to representing the high frequency signal in the spiral track to generate a position error signal used to maintain the head along a substantially circular target path; and using the servo write clock and the head internal to the disk drive to write the product servo sectors along the circular target path.

8. The disk drive as recited in claim 7, wherein the control circuitry for generating the sync mark reliability metric by:
   (a) rectifying the read signal; and
   (b) generating a DC component of the rectified read signal.

9. The disk drive as recited in claim 7, wherein the control circuitry generates the timing recovery measurement for writing the plurality of product servo sectors by:
   (a) comparing the sync mark reliability metric to a threshold;
   (b) if the sync mark reliability metric is above the threshold, generating the timing recovery measurement in response to the detected sync mark; and
   (c) if the sync mark reliability metric is below the threshold, ignoring the detected sync mark.

10. A disk drive comprising:
   (a) a disk comprising a plurality of spiral tracks, wherein each spiral track comprises a high frequency signal interrupted at a predetermined interval by a sync mark;
   (b) an actuator arm;
   (c) a head connected to a distal end of the actuator arm;
   (d) a voice coil motor for rotating the actuator arm about a pivot to position the head radially over the disk; and
   (e) control circuitry for writing a plurality of product servo sectors to the disk to define a plurality of radially spaced, concentric data tracks by;

using the head internal to the disk drive to read the spiral tracks to generate a read signal;

processing the read signal to detect a sync mark in a spiral track and generating an associated sync mark reliability metric, the sync mark reliability metric representing a probability that the sync mark was detected accurately;

generating a timing recovery measurement in response to the detected sync mark and the sync mark reliability metric;

synchronizing a servo write clock in response to the timing recovery measurement;

processing the read signal to representing the high frequency signal in the spiral track to generate a position error signal used to maintain the head along a substantially circular target path; and using the servo write clock and the head internal to the disk drive to write the product servo sectors along the circular target path wherein the control circuitry for generates the timing recovery measurement for writing the plurality of product servo sectors by:

(i) comparing the sync mark reliability metric to a threshold;

(ii) if the sync mark reliability metric is above the threshold, generating the timing recovery measurement in response to the detected sync mark;

(iii) if the sync mark reliability metric is below the threshold, ignoring the detected sync mark (iv) accumulating the consecutive number of ignored sync marks; and (v) if the accumulation exceeds a predetermined number and the sync mark reliability metric is below the threshold, generating the timing recovery measurement in response to the detected sync mark.

* * * * *

UNITED STATES PATENT AND TRADEMARK OFFICE
CERTIFICATE OF CORRECTION

| | | |
|---|---|---|
| PATENT NO. | : 7,212,364 B1 | Page 1 of 1 |
| APPLICATION NO. | : 10/769386 | |
| DATED | : May 1, 2007 | |
| INVENTOR(S) | : Tehri S. Lee | |

It is certified that error appears in the above-identified patent and that said Letters Patent is hereby corrected as shown below:

Column 10, Line 24:  Delete "timimg" and insert -- timing -- therefore.

Column 10, Line 26:  Delete "relaibility" and insert -- reliability -- therefore.

Signed and Sealed this

Sixteenth Day of March, 2010

David J. Kappos
*Director of the United States Patent and Trademark Office*